June 10, 1952  M. C. LUTERICK  2,600,010
ICE-CREAM AGITATOR OR THE LIKE
Filed July 3, 1950  2 SHEETS—SHEET 1
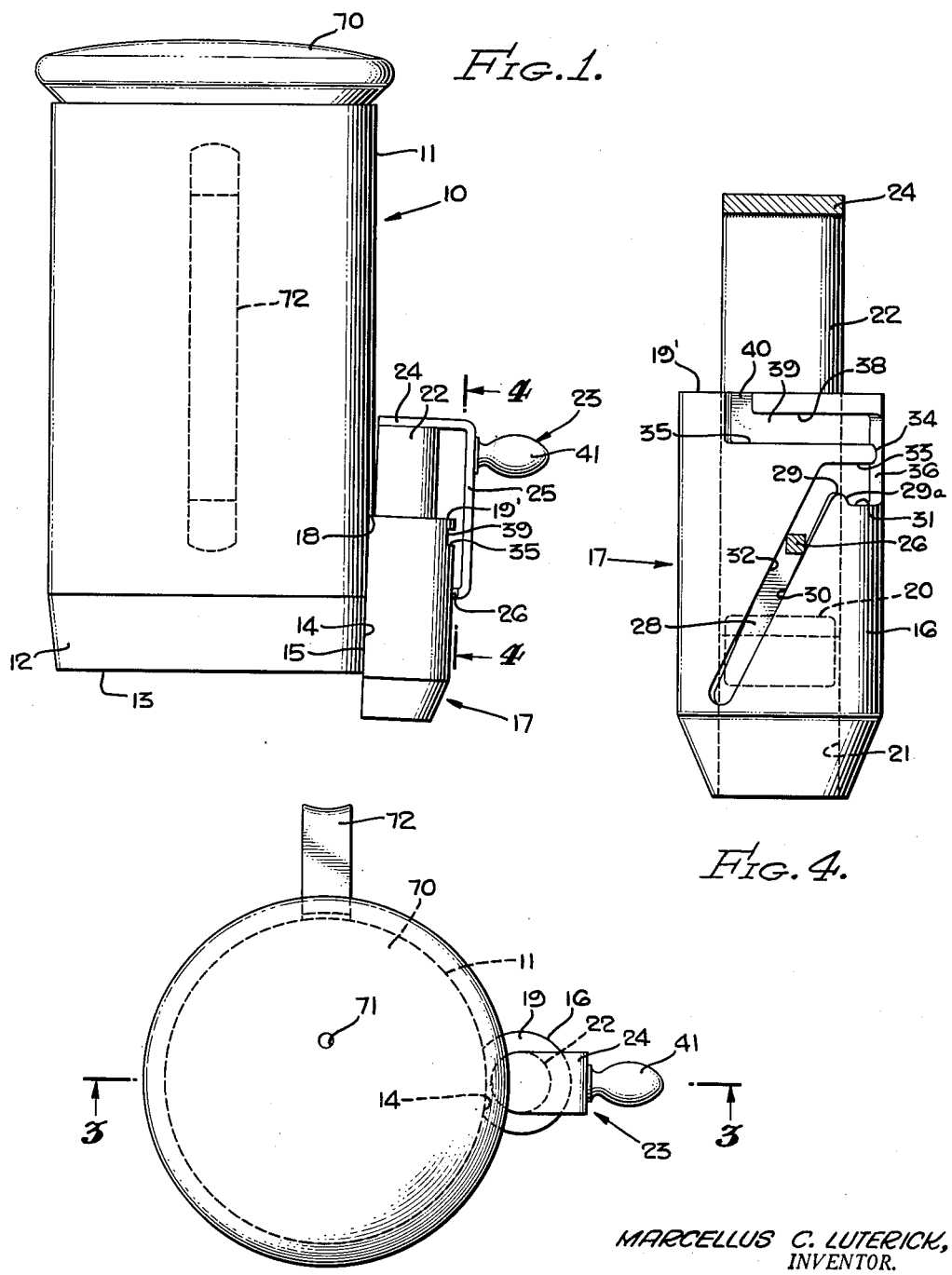
MARCELLUS C. LUTERICK,
INVENTOR.
BY
ATTORNEY June 10, 1952  M. C. LUTERICK  2,600,010
ICE-CREAM AGITATOR OR THE LIKE
Filed July 3, 1950  2 SHEETS—SHEET 2

MARCELLUS C. LUTERICK,
INVENTOR.

BY

ATTORNEY

Patented June 10, 1952

2,600,010

UNITED STATES PATENT OFFICE 2,600,010

ICE-CREAM AGITATOR OR THE LIKE

Marcellus C. Luterick, Montrose, Calif., assignor to Arden Farms Co., Los Angeles, Calif., a corporation of Delaware Application July 3, 1950, Serial No. 171,812

2 Claims. (Cl. 259—44)

This invention relates to an agitator device and particularly pertains to an ice cream agitator or the like.

In my co-pending applications Serial No. 113,054, filed August 30, 1949, now Patent No. 2,516,895, dated August 1, 1950, and Serial No. 132,499, filed December 12, 1949, for U. S. Letters Patent of which the present application is a continuation in part, I have disclosed a device particularly adapted for reducing ice cream from its normal solid consistency to a mass of semi-solid character which may more readily flow and which will be in a sufficiently fluid state to fill a container or to be poured over confections or pastries. It has been found in the operation of these structures that it is necessary to provide a whipping member and to drive it around an axis at a relatively high rate of speed. Since the ice cream is frozen to a solid consistency it is obvious that the whipping unit which is required to reduce the ice cream to a fluid or semi-fluid consistency is subjected to severe strain and that the parts of the whipping unit must be so designed as to resist bending or breakage readily. In a structure of the character described, the health and sanitation laws provide that means treating or containing ice cream and other milk products must be easily and readily cleaned and rendered sterile. It is desirable, therefore, to provide an agitating unit which may be removed easily and which may be quickly and thoroughly sterilized by submersion of the unit in a solution which has heat or chemical sterilization properties. It has also been found that in structures of this character, valve means must be provided to establish or interrupt the flow of the material treated in the device and to insure that the parts of the valve structure may be easily operated and separated so that they may be quickly sterilized and further that the valve will positively cut off the flow of fluid material to prevent dripping of the valve after the valve has been closed.

It is the principal object of the present invention therefore to provide an agitating structure including a container into which solid or semi-solid material is deposited and thereafter agitating the material by means strong and rigid in construction and acting directly to engage the material and to insure that the agitating unit will not be damaged due to the strain imposed upon it, the agitating structure being so designed as to permit it to be easily removed and sterilized. It is a further object of the present invention to provide a non-dripping valve unit, the parts of which may be manipulated easily and which structure is so designed as to insure that fluid material passing therethrough will not drip but will close positively.

The present invention contemplates the provision of an agitating structure including a vertically disposed container in which solid or semi-solid materials may be deposited and at the bottom of which container a rigid agitating member is provided which is detachably secured in driving relation to a source of power and is so constructed as to insure that the material in the container will be acted upon to be reduced in consistency and the flow from the container is controlled by a valve. The valve agitator and container being capable and ready for separation and sterilization of the parts.

The invention is illustrated by way of example in the accompanying drawings, in which:

Figure 1 is a view in side elevation showing the structure with which the present invention is concerned.

Fig. 2 is a view in plan showing the structure as illustrated in Fig. 1.

Fig. 4 is an enlarged view in elevation as viewed substantially on the line 4—4 of Fig. 1 and shows the valve structure with which the present invention is concerned.

Figure 3:
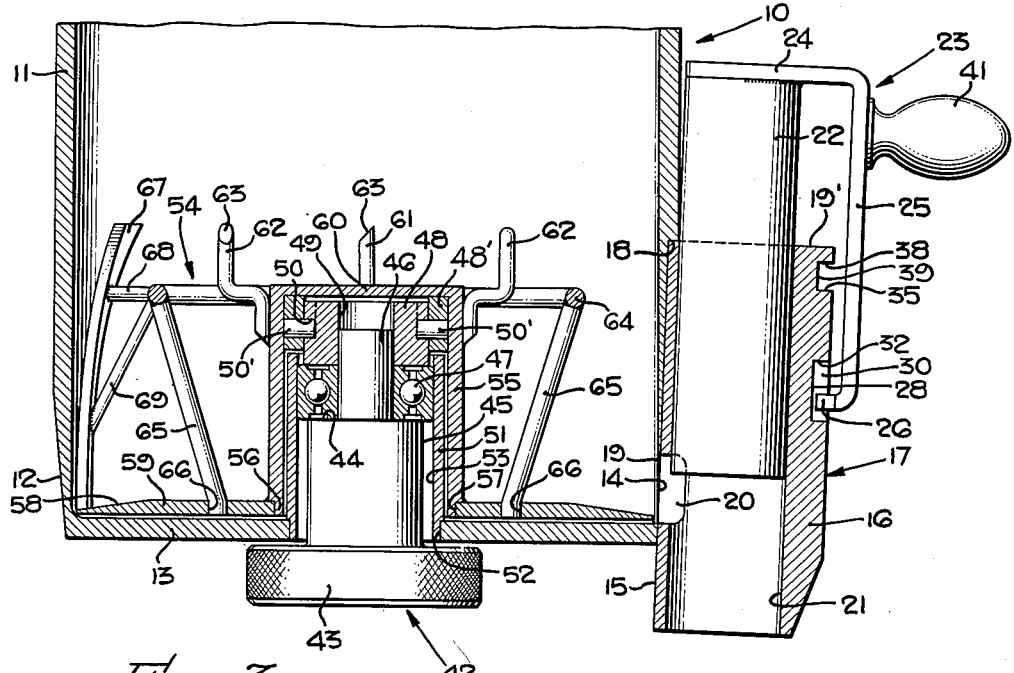
Fig. 3 is an enlarged view as seen on the line 3—3 of Fig. 2 and indicates the details of construction on the lower end of the container, the agitator and also the valve.
Figure 6:
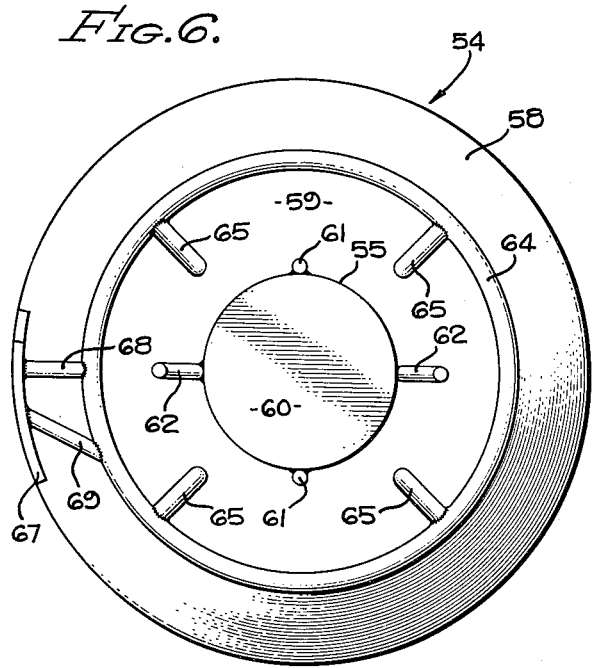
Fig. 6 is a view in plan showing the design of the agitator and the arrangement of the shipping tines.

Referring more particularly to the drawing, 10 indicates a canister having a cylindrical sidewall 11. The lower end of the canister is formed with a tapered face 12 which terminates in an end wall 13. At one point in the circumference of the tapered face 12, a flat face 14 is provided to form a seat against the outer flat face 15 of a cylindrical valve wall 16 of the valve housing 17. The face 14 terminates in a horizontal shoulder 18, the shoulder 19' of the cylindrical wall 16 and abuts against it. At the lower end of the tapered face 14 an outlet opening 19 is formed through the cylindrical wall 11 of the canister and registers with a port 20 formed through the wall 16 of the valve structure. The cylindrical valve wall 16 is tubular and provides a straight tubular opening 21 therethrough and with which the port 20 communicates. The opening 21 is opened at its upper end and receives a straight cylindrical valve plunger 22. Attention is directed to the fact that the plunger 22 is straight throughout its length and that it conforms to the diameter of the bore 21 throughout the vertical length of the valve structure 17. Attention is also directed to the fact that a desired length of the tubular valve wall 16 extends a material distance below the horizontal level of the port 20 to insure that the valve plunger 22 will extend entirely across the mouth of the port 20 when in a closing position. This will act to close the port 20 completely and prevent any tendency for the valve to drip when it is closed. Furthermore, it will be possible to seal the valve due to the fact that the cylindrical valve plunger has a material length fitting the bore 21 closely and extending below the level of the port 20. The horizontal level of the port 20 is such as to insure that fluid from the canister 10 may easily flow into the bore 21 due to the operation of an agitator to be hereinafter described.

The valve plunger is fitted with a handle structure 23 which has an upper portion 24 extending in a plane at right angles to the longitudinal axis of the plunger. This portion of the handle is preferably silver soldered into position. A portion 25 extends downwardly and parallel to the plunger of the valve plunger and terminates with an inturned finger 26 by which the valve is held in various positions and which guides the valve in its longitudinal movement and during axial rotation thereof. The inturned finger 26 is designed to extend into a cam guide and lock slot 27 which is cut into the cylindrical outer face of the valve housing 17 and is particularly shown in Fig. 5 of the drawing. Here it will be seen that the cam groove 27 comprises an inclined portion 28 along which the finger 26 may extend. The walls of the groove 28 are parallel for a length, however. One wall terminates with a convex portion 29 over which the finger 26 must be lifted. The convex portion is substantially V-shape and is formed with a continuation of sidewall 30 of groove 28. The opposite side of the convex portion 29 is formed by an inclined face 29a which leads downwardly to a flat face 31. The flat face 31 is in a plane parallel to the longitudinal axis of the valve. This face extends for a distance and accommodates the finger 26 when in register therewith. The groove 28 is formed by faces 30 and 32 which are parallel for a distance. The upper end of face 32 terminates in a horizontal face 33 which overhangs the convex portion 29 and a portion of the flat face 31. The face portion 33 is parallel to the portion 31 and terminates with a vertical shoulder 34 which continues in a flat portion 35 and is parallel to the face 33. Extending upwardly from the end of the face 31 is a vertical face 36 which cooperates with a portion 39 to form a throat 37. The face 36 continues in a horizontal length 38 to form a horizontal groove 39 which terminates in an upwardly presented throat 40. It is to be understood that the grooves 28 and 29 in the throats 37 and 40 are of proper dimensions to accommodate the finger 26 and to permit the finger to travel along the grooves and through the throats as desired. The handle structure 23 is provided with a knob 41 which permits the handle structure to be manipulated as a finger 26 moves along the grooves and as the plunger 21 is moved toward and from its closing position.

The structure disclosed in the previous portion of the specification has had to do with a container for ice cream and the like to be agitated and a valve by which the flow of fluid from the container may be controlled and the flow may be interrupted without dripping. It is understood that this valve may be used on any particular fluid although in the present case it is desirable to control the flow of a semi-solid material such as softened ice cream.

Referring particularly to Fig. 3 of the drawing, the means for softening ice cream and reducing it from a solid or semi-solid state to a fluid state is shown. The canister 10 is designed to be disposed in driving connection to a motor or other source of power not here shwn. The driving connection on the canister includes a central spindle 42 which is formed at its lower end with a knurled nut 43 having a portion in engagement with the source of power. Intermediate the length of the spindle a shoulder 44 is provided due to the fact that the lower end of the spindle is of large diameter as indicated at 45 and that the upper end of the spindle is of reduced diameter as indicated at 46. Resting upon the shoulder 44 is an anti-friction ball bearing structure generally indicated at 47. Positioned upon the upper and reduced end portion 46 of the spindle is a locking collar 48 having a central bore 49 to receive the spindle. The locking collar is fastened to the spindle portion 46 and on its outer circumferential face, bayonet slots 50 are formed. These slots receive pins 50' which are carried by the cylindrical sleeve 55 and extend inwardly to engage the slot. A suitable bushing 48' fits between the upper end of the collar 48 and the cylindrical sleeve 55. The anti-friction bearing 47 is of greater diameter than the locking collar 48 and fits firmly within a fixed bearing sleeve 51. The bearing sleeve 51 is tubular and is readily secured at its lower end through a bore 52 in the bottom wall 13 of the canister. The upper end extends a pre-determined distance above the upper face of the anti-friction bearing structure 47 and forms a free annular open area 53 between the lower spindle section 45 and the tubular member 51. The height of the upper edge of the tubular bearing sleeve 51 is such as to insure that it will lie in a horizontal plane above the horizontal plane of the accumulated fluid within the canister when the machine is in operation. Due to this construction, the milk and other fluid within the canister will not reach the anti-friction bearing 47 and in fact any grease or oil occurring within the anti-friction bearing 47 will not drain into the canister.

The ice cream is mixed by the agitating structure shown in Fig. 3 of the drawings. This structure is on the same general line as that disclosed in my previous co-pending applications as above mentioned, however, due to the extreme strains to which the agitating unit is subjected, an improved agitating structure is here shown and is indicated at 54. The central portion of the agitator comprises a rigid cylindrical member 55 which fits over the tubular bearing sleeve 51 and has a running fit with relation thereto. The lower end of the cylindrical member 55 has a reduced portion 56 which is circular in shape and fits into a bore 57 of a disc 59. The disc 59 is relatively thin in vertical thickness and has an outer tapered portion 58 which terminates adjacent the corner defined by the canister sidewall 11 and the canister bottom 13. The bottom face of the disc 59 is flat and smooth and conforms to the face of the bottom wall 13 which is presented to it. These two faces are closely disposed with relation to each other so that there will not be probability for fluid to flow between the two faces but there will be a probability that the rotation of the disc 59 at high speed will set up a centrifugal force which will tend to work the fluid outwardly toward the sidewall 11 of the canister and will aid in preventing any fluid from passing into the vertical space between the inner wall of the cylindrical member 55 and the outer wall of the bearing sleeve 51. The upper end of the cylindrical structure 55 is completely closed by a member 60 which acts in operation with the cylindrical member 55 to completely house the upper end of the spindle and to prevent extraneous matter from entering or leaving the area containing the bayonet lock slot and the anti-friction bearing structure. In order to agitate solids and semi-solids which are placed within the canister 10 a plurality of vertical agitating tines 61 and 62 are provided and extend upwardly above the plane of the disc 60.

The tines 61 are straight and are secured to the member 55. The tines 62 are offset so that the tines 61 and the tines 62 describe different circular orbits when the agitator is rotated. The ends of all of the tines are formed with an inclined face as indicated at 63. The inclined faces occur on the trailing edges of the tines so that the sharpened portions of the tines will first encounter the material to be agitated and will have greater tendency to enter and disintegrate the mass of material being acted upon. Circumscribing the upper end of the cylindrical member 55 and lying substantially in the same horizontal plane therewith is a ring 64 which is of a materially greater diameter than the diameter of the cylinder 55. This ring is supported at equally spaced intervals throughout the circumference thereof by inclined posts 65 which extend through openings 66 in the disc 59 and are secured in position by silver solder or other means. The ring 64 is preferably secured to the upper ends of the posts 65 by silver solder or the like.

It will be seen in Fig. 3 of the drawing that the posts 65 extend outwardly and thus co-act with the cylindrical member 55 to form a basket-like structure within which fragments of the broken solid material to be treated may be temporarily held and gyrated thus acting to throw the material against the posts 65 and therebetween to insure that a thorough partial reduction will be obtained.

One of the objectionable operations found in the whipping of ice cream is a canister to reduce the material to a fluid consistency is that there is a tendency for the material to form a mass around the agitating member which becomes sufficiently solid as the agitator moves at high speed to cause the solid material to freeze before the partial reduction has taken place. This will cause the mass of material to adhere appreciably to the sidewall of the canister 10 and will add an objectionable load to the agitator which is in fact great enough to overload and stall the motor. This result has been to a material extent obviated by causing the relatively smooth disc 59 to rotate over and in close proximity to the upper polished face of the bottom wall 13 of the canister. The result is also eliminated by the provision of the ring 54 and the basket-like structure on the agitator which will tend to cause the mass of material being treated to be held away from the sides of the canister so that adherence of the mass with the canister wall will be minimized. Another expedient has been provided to limit the load upon the driving motor as imposed by the agitator and that is a scraping blade 67 which extends upwardly from the disc 59 and is inclined so that its trailing edge is uppermost. The lower end of the scraping blade 67 is secured rigidly to the circumferential edge of the disc 59 but the upper edge is free. It is, however, connected to the ring 54 at a point intermediate its ends by two struts 68 and 69 which are disposed in angular relation for the purpose of strength. The canister 10 may be closed by a lid 70 as shown in the drawings. This lid is provided with a vent hole 71. The canister may also carry a handle 72.

In operation of the present invention the structure is assembled as shown in Fig. 1 of the drawings. The agitator 54 is placed within the canister 10 and is positioned in driving relation to the motor or other source of power beneath the canister. When the agitator 54 is placed in position, the cylindrical member 55 of the agitator is slipped over the bearing sleeve 51 which is secured in the bottom of the canister. The pins 50' are then positioned within the bayonet slots 50 formed in diametrically opposite sides of the collar 48. As the agitator is thus moved downwardly into a locked position, the collar 48 will rest upon the upper face of the anti-friction bearing 47. This in turn is held against the upper face 44 of the enlarged portion 45 of the spindle 42. The disc 59 will overhang the entire upper face of the bottom wall 13 of the canister and will fit snugly within the cylindrical sidewall 11. The valve plunger 22 has been lowered into position within the valve housing 17 and will thus close the port 20 leading from the canister into the housing. It is, of course, understood that at this time the closure 70 has been removed so that ice cream or like products may be introduced into the canister. The source of power may then be placed in operation to drive the spindle 42 and in turn to drive the agitator 54. As this rotates larger particles of ice cream will fall upon the top of the agitator and may rest directly upon the disc 60 or in the space between the ring 64 and the supporting member 65. It will also be recognized that large particles may be impaled upon the upwardly extending members 61 and 62 so that the pieces of material may be given a gyrating motion or may be cut or disintegrated as the members 61 and 62 rotate. Attention is also directed to the fact that the members 61 and 62 are positioned so that they are at different radial ends from the axis of the agitator, thus insuring that as they move along their orbits they will encounter the material to be whipped at different distances from the center of the mass. By this action a more thorough and rapid agitation may be accomplished.

Figure 5:
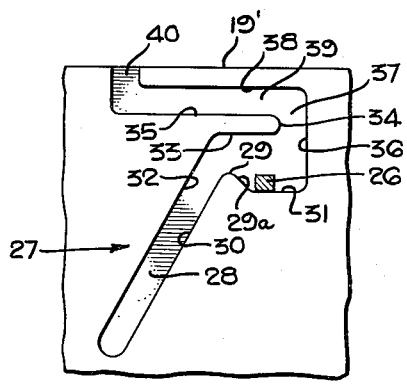
Fig. 5 is a fragmentary view showing a portion of the developed surface of the valve housing and particularly illustrates a valve lock and guiding cam.

In the event that material is to be withdrawn from the machine, the valve plunger 22 may be raised first so that the gyrating action of the agitating member will tend to throw the fluid material out through the port 20 and permit it to flow downward through the bore 21 and to be discharged. The valve plunger 22 need not be manually supported since it is possible for the finger 26 of the handle 23 to be lifted along the groove 28 as shown in Fig. 5 until the finger 26 passes over the upwardly projecting V-shape portion 29 and rests upon the flat face 32 of the groove. It will be seen that the engagement of the finger 26 and the upwardly inclined portion 28 of the groove will impart a rotational motion to the plunger to prevent the plunger from sticking within the bore of the valve housing. In the event that the plunger is to be removed for cleaning, the finger may be passed upwardly through the throat 37 and along the groove 39 to the throat 40 from which it may be removed. It is obvious that in the event the canister and the agitator are to be sterilized the canister may be easily lifted from its driving position and the agitator 54 may be lifted from the spindle and bearing assembly. After the parts of the valve and the agitator have been properly cleaned and sterilized they may be re-assembled and the structure will be ready for re-use.

It is to be understood that for the purpose of hygiene and sterilization of parts of this device it is desirable to burr all of the edges of the parts and thereafter to electro-polish the parts so that there will not be any flaws or pits present on the surface of any part.

It will thus be seen that the structure here disclosed provides strong and effective means for treating solids and semi-solids and reducing them to a fluid state and also insures that when treating ice cream apparatus may be maintained hygenic and sterile and its parts may be easily separated and assembled for the purpose of sterilization. It will also be evident that the agitating structure and the valve structure are simple in construction and may be easily operated, removed and replaced.

While I have shown the preferred form of my invention it will be evident that various changes in the combination, construction and arrangement of parts may be made by those skilled in the art without departing from the spirit of my invention as claimed.

Having thus described my invention, what I claim and desire to secure by Letters Patent is:

1. In an agitating device including a container having a bottom, upwardly through which, a central driving spindle extends and within which container solid or semi-solid materials are acted upon to be reduced to fluid state: an agitator formed with a central cylindrical tubular hub telescoping over said driving spindle, means for locking said hub into driving engagement with said spindle, a circular relatively flat and thin disc secured to the lower edge of said hub and lying close to the bottom of the container, a plurality of posts secured to said disc and extending upwardly therefrom, a ring carried by the upper end of said posts, said ring being of substantially greater diameter than the diameter of said agitator hub whereby a basket-like structure will be formed around said hub, and a plurality of upwardly projecting tines carried by said hub above said ring whereby material placed in the container will be reduced to fluid state as the agitator is driven.

2. A structure of the character set forth in claim 1 in which the agitator carries an upwardly projecting and inclined scraping blade disposed with its lower end contiguous to the circumferential edge of the disc and with its length approximately contacting the cylindrical surface of the container along which it moves.

MARCELLUS C. LUTERICK.

REFERENCES CITED

The following references are of record in the file of this patent:

UNITED STATES PATENTS

| Number | Name | Date |
|---|---|---|
| 1,387,380 | Fryer | Aug. 9, 1921 |
| 1,681,464 | Cameto | Aug. 21, 1928 |
| 2,082,752 | Lewis et al. | June 1, 1937 |
| 2,116,556 | Bellis | May 10, 1938 |
| 2,213,680 | Share | Sept. 3, 1940 |
| 2,240,213 | Fromm | Apr. 29, 1941 |
| 2,313,760 | McLean | Mar. 16, 1943 |
| 2,516,895 | Luterick | Aug. 1, 1950 |
| 2,517,997 | Fredericks | Aug. 8, 1950 |